United States Patent [19]
Yoshimoto et al.

[11] Patent Number: 5,223,054
[45] Date of Patent: Jun. 29, 1993

[54] METHOD FOR PRODUCING HYDROGEN STORAGE ALLOY RESISTANT TO MICRONIZATION

[75] Inventors: Kazuyuki Yoshimoto; Toru Ogasawara; Eiji Hiraki; Shinichi Tanioka, all of Hiroshima, Japan

[73] Assignee: Mazda Motor Corporation, Hiroshima, Japan

[21] Appl. No.: 853,141

[22] Filed: Mar. 18, 1992

[30] Foreign Application Priority Data

Mar. 28, 1991 [JP] Japan .................................. 3-87319
Oct. 28, 1991 [JP] Japan ................................. 3-280981

[51] Int. Cl.$^5$ .......................... C22C 14/00; C01B 6/00
[52] U.S. Cl. ................................... 148/669; 419/47; 419/64; 420/900
[58] Field of Search ................... 148/669; 420/900; 419/47, 64

[56] References Cited

U.S. PATENT DOCUMENTS

| 4,259,110 | 3/1981 | Pezat ................................ 420/900 |
| 4,798,718 | 1/1989 | Bogdanovic ....................... 420/900 |
| 5,024,813 | 6/1991 | Nishiyama .......................... 419/47 |

FOREIGN PATENT DOCUMENTS

59-11652 3/1984 Japan .
59-50744 12/1984 Japan .

Primary Examiner—Upendra Roy
Attorney, Agent, or Firm—Sixbey, Friedman, Leedom & Ferguson

[57] ABSTRACT

Hydrogen storage alloy includes porous base hydrogen storage alloy and Mg which is fused, conjugated with the base hydrogen storage alloy and diffused in the base hydrogen storage alloy.

5 Claims, 4 Drawing Sheets

HYDROGEN STORAGE ALLOY PRESSING
↓
Mg INFILTRATION
↓
HEAT-DIFFUSE

METHOD FOR PRODUCING HYDROGEN STORAGE ALLOY RESISTANT TO MICRONIZATION

BACKGROUND OF THE INVENTION

1. Field of the Invention

This invention relates to a hydrogen storage alloy and a method of producing the same.

2. Description of the Prior Art

As a clean energy source which can substitute for fossil fuel, hydrogen storage alloys which store hydrogen in the form of a metal hydride have been attracting attention. Storage, transfer and release of hydrogen can be effected by use of hydrogenation and dissociation of metal. As such a hydrogen storage alloy, there have been known hydrides of transition metals such as Zr, Ti and the like.

The hydrogen storage alloy repeats expansion and contraction each time it store and release hydrogen, and it is cracked by strain energy generated upon expansion and contraction. Known hydrogen storage alloys are micronized into fine powder of about 15 $\mu$m in several times to one hundred times of storage and release. When the hydrogen storage alloy is micronized, the heat conductivity deteriorates and the storage efficiency lowers, and at the same time, micronized alloy powder is disperses through the filter to cause environmental pollution and to adversely affect the equipments. Further, since it is disabled from functioning as a hydrogen storage alloy after a small number of times of storage and release, the cost of hydrogen fuel becomes too high for practical use.

Thus, it has been a great demand for a hydrogen storage alloy having a high resistance to micronization.

SUMMARY OF THE INVENTION

In view of the foregoing observations and description, the primary object of the present invention is to provide a hydrogen storage alloy having an improved resistance to micronization.

Another object of the present invention is to provide a method of producing a hydrogen storage alloy having an improved resistance to micronization.

The hydrogen storage alloy in accordance with the present invention comprises porous base hydrogen storage alloy and Mg which is fused, conjugated with the base hydrogen storage alloy and diffused in the base hydrogen storage alloy.

Mg is light in weight and inexpensive, has a low softening point and is excellent in malleability, and accordingly it absorbs and suppresses stress generated by expansion when the hydrogen storage alloy stores hydrogen.

Preferably, the base hydrogen storage alloy is selected from a group consisting of TiMn alloys, TiZrMnCrCu alloys and ZrFeCr alloys which can store and release at a temperature near the room temperature and have a large hydrogen storage capacity. Among those, $TiMn_{1.5}$, $Ti_{0.6}Zr_{0.4}Mn_{0.8}CrCu_{0.2}$ and $Zr(Fe_{0.7}Cr_{0.3})_2$ are especially preferable.

Preferably the amount of Mg added to the base hydrogen storage alloy is in the range of 2.5 to 10 wt. %. When the amount of Mg is smaller than 2.5 wt. %, absorption of stress generated by expansion cannot be satisfactory, and since the hydrogen storage capacity reduces as the amount of Mg increases, the amount of Mg is preferably not larger than 10 wt. %.

The method of the present invention comprises steps of infiltrating Mg into a green compact of base hydrogen storage alloy in a non-oxidizing atmosphere under a pressure and heat-diffusing the Mg. In accordance with this method, molten Mg flows into the void of the green compact and is infiltrated, whereby Mg is uniformly distributed in the green compact. Accordingly Mg is uniformly diffused by the subsequent heat treating. Thus the amount of Mg to be added may be small and accordingly reduction in the hydrogen storage capacity can be minimized.

When the green compact of the base hydrogen storage alloy infiltrated with Mg is heat-treated, diffusion layer is formed in the boundary of Mg and the base hydrogen storage alloy and the bond strength therebetween is enhanced, and at the same time, Mg robs the base hydrogen storage alloy of oxygen to reduce it, thereby increasing the hydrogen storage capacity. It is preferred that the heat-treating be effected in a temperature range of 200° C. to 650° C. When the temperature is lower than 200° C., the diffusion is hard to form and the temperature is higher than 650° C., Mg is melted.

DESCRIPTION OF PREFERRED EMBODIMENT

EXAMPLE 1

Hydrogen storage alloy powder represented by formula $TiMn_{1.5}$ and having particle size of not larger than 50 $\mu$m was pressed under a pressure of 7 ton/cm$^2$ and a green compact having a density ratio of 85% was obtained. Mg was provided around the green compact in 7% by weight and the green compact was heat-treated in a non-oxidizing atmosphere, e.g., Ar gas atmosphere, under a pressure of 2 kfg/cm$^2$ at 700° C. for 0.5 hours, thereby infiltrating Mg into the green compact. Then the Mg-infiltrated green compact was further heat-treated in an Ar gas atmosphere under a pressure of 2 kfg/cm$^2$ at 500° C. for 20 hours, and Mg was diffused. Thus Mg-conjugated hydrogen storage alloy in accordance with an embodiment of the present invention (containing 7 wt. % Mg added and diffused therein) was obtained.

Figure 1:
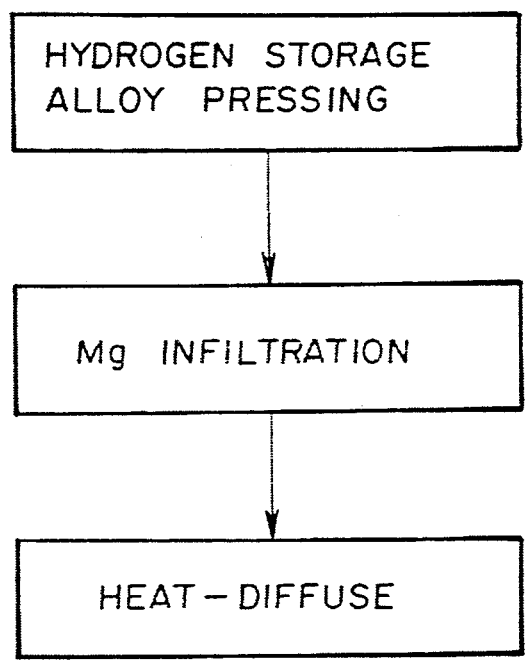
FIG. 1 is a flow chart for illustrating the method of producing the hydrogen storage alloy in accordance with the present invention.
Figure 2:
FIG. 2 is an electron micrograph showing the inner structure of the hydrogen storage alloy obtained in the example 1.

As shown in FIG. 2 (photograph), in the Mg-conjugated hydrogen storage alloy, Mg (the dark portion) was infiltrated in TiMn$_{1.5}$ (the white to gray portion) and a diffusion layer was formed in the boundary of Mg and TiMn$_{1.5}$. That is, in the Mg-conjugated hydrogen storage alloy, Mg functions as binder. When the hydrogen storage alloy stores hydrogen and expands, Mg absorbs and suppresses stress generated by expansion and prevents production of crack during repetition of storage and release of hydrogen, thereby greatly improving the resistance to micronization. Control hydrogen storage alloy without Mg was prepared by simply pressing hydrogen storage alloy powder represented by formula TiMn$_{1.5}$ and having particle Size of not larger than 50 μm under a pressure of 7 ton/cm$^2$. The control hydrogen storage alloy was micronized after repeating storage and release about 20 times. On the other hand, the Mg-conjugated hydrogen storage alloy of this embodiment was not micronized even after repeating storage and release about 600 times.

The resistance to micronization of hydrogen storage alloys can also be improved by adding Mg through mixing of Mg powder and the hydrogen storage alloy powder and then heat-diffusing Mg. However in accordance with this method, a large amount, e.g., 10 to 45 wt. %, of Mg is required to improve the resistance to micronization in contrast to the method of the present invention where Mg is added to the base hydrogen storage alloy by infiltration and the resistance to micronization can be improved by adding a small amount, i.e., 2.5 to 10 wt. %, of Mg. As can be understood from FIG. 3, the storage capacity (the amount of hydrogen which can be stored in the hydrogen storage alloy) reduces as the amount of Mg added to the base hydrogen storage alloy increases. TiMn$_{1.5}$ hydrogen storage alloy powder having particle size of not larger than 50 μm was mixed with 7 wt. % of Mg powder having particle size of not larger than 50 μm and pressed under a pressure of 7 ton/cm$^2$. Then the green compact thus obtained was heat-diffused in an Ar gas atmosphere under a pressure of 2 kfg/cm$^2$ at 500° C. for 20 hours. In the Mg-conjugated hydrogen storage alloy thus obtained, micronization appeared after repeating storage and release about 50 times.

Figure 3:
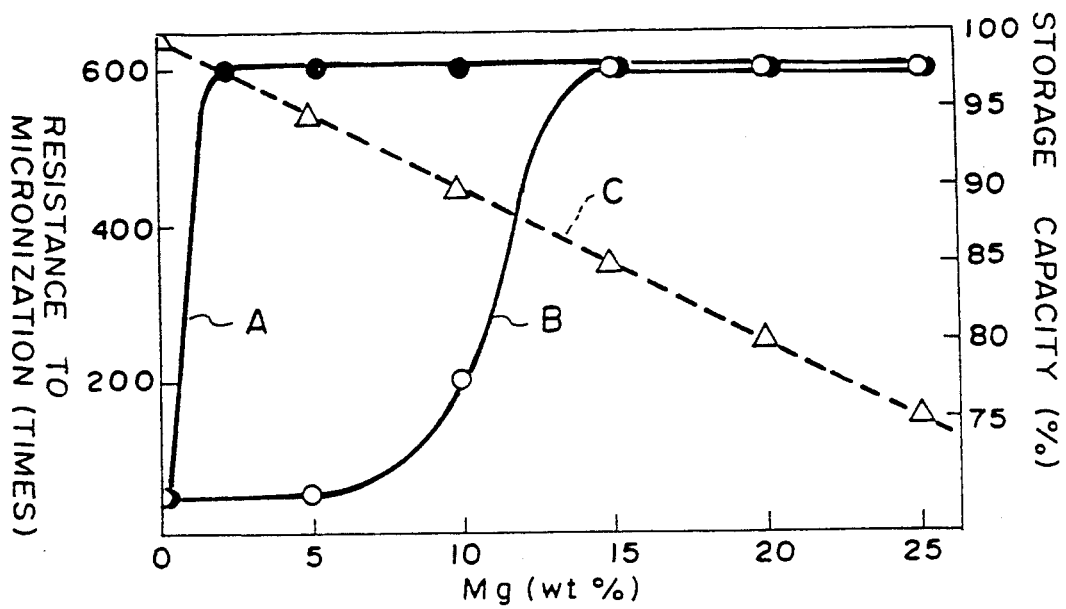
FIG. 3 shows the relation between the amount of Mg (wt. %) added to the base hydrogen storage alloy and the resistance to micronization in terms of the times of repetition of storage and release at which the hydrogen storage alloy is micronized and the relation between the amount of Mg (wt. %) added to the base hydrogen storage alloy and the hydrogen storage capacity.

FIG. 3 shows the relation between the amount of Mg (wt. %) added to TiMn$_{1.5}$ hydrogen storage alloy and the resistance to micronization in terms of the times of repetition of storage and release at which the hydrogen storage alloy is micronized, curve A being for the Mg-conjugated hydrogen storage alloy of this embodiment which is obtained by infiltration of Mg and curve B being for that obtained by mixing and heat-diffusing described above. Curve C shows that the hydrogen storage capacity reduces as the amount of Mg added to the base hydrogen storage alloy increases in either of the hydrogen storage alloy in accordance with the present invention and the control hydrogen storage alloy. As can be understood from FIG. 3, by adding Mg by infiltration, the resistance to micronization of the hydrogen storage alloy can be improved with a small amount of Mg, that is, without largely reducing the storage capacity.

Figure 4:
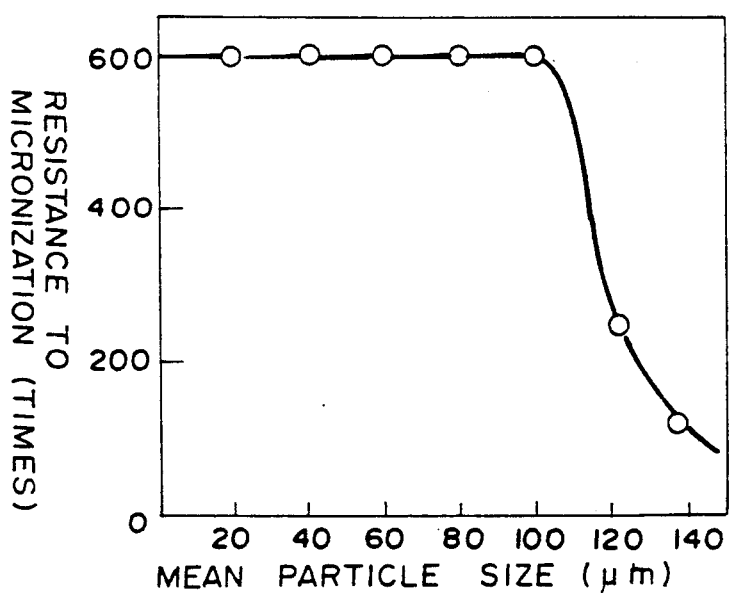
FIG. 4 shows the relation between the mean particle size of the base hydrogen storage alloy powder and the resistance to micronization when Mg is added to the base hydrogen storage alloy powder by infiltration.

FIG. 4 shows the relation between the mean particle size (μm) of the TiMn$_{1.5}$ hydrogen storage alloy powder and the resistance to micronization when Mg is added to the TiMn$_{1.5}$ hydrogen storage alloy powder by infiltration. As can be understood from FIG. 4, when the means particle size of the TiMn$_{1.5}$ hydrogen storage alloy powder is larger than 100 μm, the resistance to micronization deteriorates.

Figure 5:
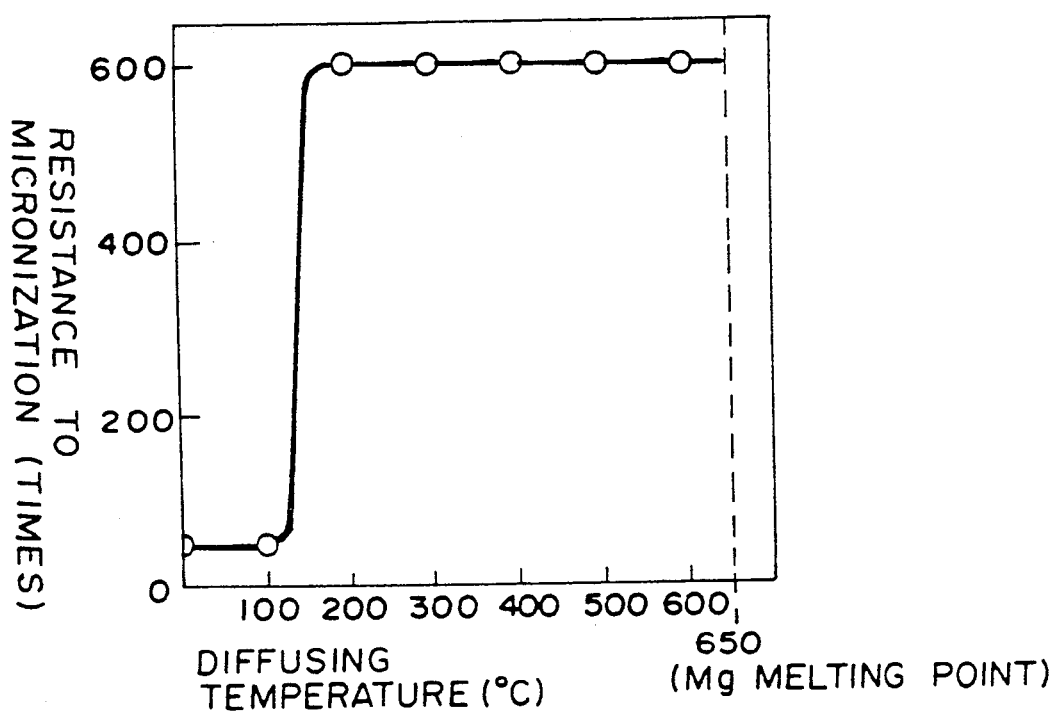
FIG. 5 shows the relation between the resistance to micronizaton and the diffusing temperature at which the $TiMn_{1.5}$ hydrogen storage alloy added with 7 wt. % of Mg by infiltration is diffused.

FIG. 5 shows the relation between the resistance to micronization and the diffusing temperature at which the TiMn$_{1.5}$ hydrogen storage alloy added with 7 wt. % of Mg by infiltration is diffused. As can be understood from FIG. 5, a desirable resistance to micronization can be obtained in the diffusing temperature range of 200° C. to 650° C.

EXAMPLE 2

Figure 6:
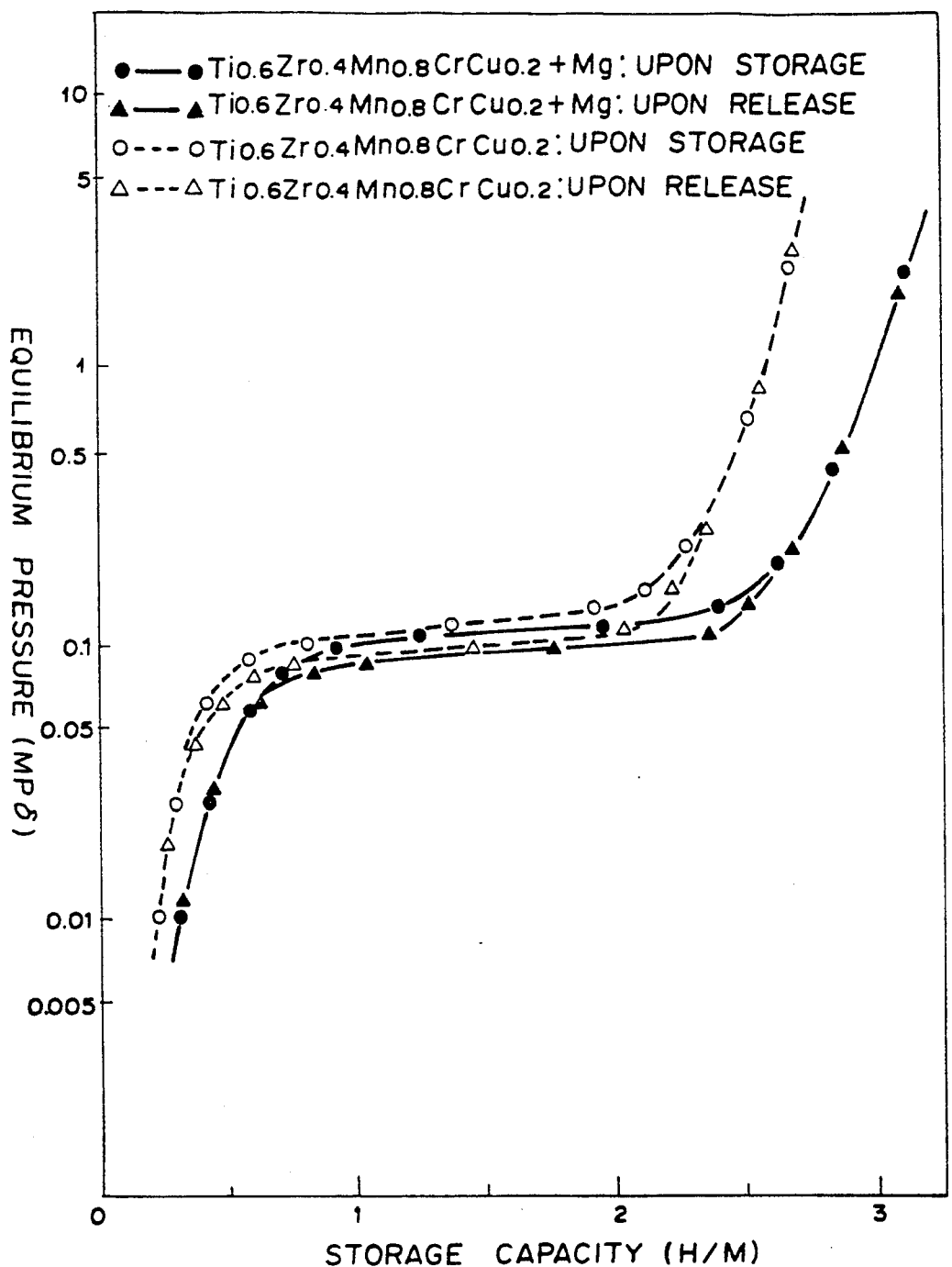
FIG. 6 is a PCT diagram representing change of the equilibrium pressure with the storage capacity.

A green compact of hydrogen storage alloy powder represented by formula Ti$_{0.6}$Zr$_{0.4}$Mn$_{0.8}$CrCu$_{0.2}$ and having particle size of not larger than 50 μm was added with Mg in the manner as in example 1. The Mg-conjugated hydrogen storage alloy thus obtained also exhibited an excellent resistance to micronization (was not micronized up to 600 times of repetition of storage and release). However, in this example, the hydrogen storage capacity increased by 15 to 20% as compared with hydrogen storage alloy not added with Mg as can be understood from the PCT diagram in FIG. 6 representing change of the equilibrium pressure MPσ with the storage capacity (number of molecules of hydrogen). It may be because atoms of one or more of Ti, Zr, Mn, Cr and Cu forms compound of Mg and the compound storages hydrogen. In FIG. 6, the curve joining black circles represents the change of the equilibrium pressure MPσ upon storage of hydrogen for the Mg-conjugated hydrogen storage alloy of this example, the curve joining black triangles represents the change of the equilibrium pressure MPσ upon release of hydrogen for the Mg-conjugated hydrogen storage alloy of this example, the curve joining white circles represents the change of the equilibrium pressure MPσ upon storage of hydrogen for hydrogen storage alloy not added with Mg, and the curve joining white triangles represents the change of the equilibrium pressure MPσ upon release of hydrogen for the hydrogen storage alloy not added with Mg.

EXAMPLE 3

Hydrogen storage alloy powder represented by formula Zr(Fe$_{0.7}$Cr$_{0.3}$)$_2$ and having particle size of not larger than 50 μm was pressed under a pressure of 7 ton/cm$^2$ and a green compact having a density ratio of 85% was obtained. Mg was provided around the green compact in 7% by weight and the green compact was heat-treated in a non-oxidizing atmosphere, e.g., Ar gas atmosphere, under a pressure of 40 kfg/cm$^2$ at 700° C. for 0.5 hours by an autoclave, thereby infiltrating Mg into the green compact. Then the Mg-infiltrated green compact was further heat-treated in an Ar gas atmosphere under a pressure of 2 kfg/cm$^2$ at 500° C. for 20 hours, and Mg was diffused. The Mg-conjugated hydrogen storage alloy of this embodiment was not micronized even after repeating storage and release about 600 times, and its hydrogen storage capacity was reduced by only about 7% as compared with the hydrogen storage alloy not added with Mg.

EXAMPLE 4

Hydrogen storage alloy powder represented by formula TiMn$_{1.5}$ and having particle size of not larger than 50 μm was mixed with 7 wt. % of Mg powder having particle size of not larger than 50 μm. The mixture was filled into a steel pipe which was 14 mm in inner diameter and 100 mm in height, and a green compact having Mg fused and conjugated therewith was obtained by hot isostatic pressing of the mixture at 700° C., 1000 atp for 2 hours. Then the obtained green compact was subjected to heat-treating at 500° C., 100 atp for 20 hours. That is, in this embodiment, the base hydrogen storage alloy powder was mixed with Mg powder in advance and then the mixture was heat-treated at a high temperature higher than the melting point of Mg, thereby fusing Mg and conjugating Mg with the base hydrogen storage alloy. The Mg-conjugated hydrogen storage alloy of this embodiment was not micronized even after repeating storage and release about 300 times, and its hydrogen storage capacity was reduced by only about 7% as compared with the hydrogen storage alloy not added with Mg.

EXAMPLE 5

Hydrogen storage alloy powder represented by formula $TiMn_{1.5}$ and having particle size of not larger than 50 μm was pressed under a pressure of 7 ton/cm$^2$ and a green compact having a density ratio of 85% was obtained. The green compact and 7 wt. % of Mg powder were filled into a steel pipe which was 14 mm in inner diameter and 100 mm in height, and a hydrogen storage alloy having Mg fused and conjugated therewith was obtained by hot isostatic pressing and heat-treating under the same condition as in example 4. The Mg-conjugated hydrogen storage alloy of this embodiment exhibits characteristics substantially the same as that obtained in example 4.

In the Mg-conjugated hydrogen storage alloy in accordance with the present invention, Mg added to and diffused in the base hydrogen storage alloy absorbs and suppresses stress generated by expansion when the hydrogen storage alloy stores hydrogen and prevents production of crack during repetition of storage and release of hydrogen, whereby the resistance to micronization is greatly improved and service life of the alloy is greatly elongated.

Further, in accordance with the method of the present invention, Mg is added to a green compact of the porous base hydrogen storage alloy by infiltration at a temperature higher than the melting point of Mg. Accordingly molten Mg flows into the void of the green compact and is infiltrated, whereby Mg is uniformly distributed in the green compact. Accordingly Mg is uniformly diffused by the subsequent heat treating. Thus the amount of Mg to be added may be small and accordingly reduction in the hydrogen storage capacity can be minimized.

What is claimed is:

1. A method of producing hydrogen storage alloy resistant to micronization comprising porous base hydrogen storage alloy and Mg which is fused, conjugated with the base hydrogen storage alloy and diffused in the base hydrogen storage alloy which method comprising the steps of infiltrating Mg into a green compact of base hydrogen storage alloy in a non-oxidizing atmosphere under a pressure and heat-diffusing the Mg.

2. A method as defined in claim 1 in which said green compact is obtained by pressing powder of said base hydrogen storage alloy having a mean particle size not greater than 100 μm.

3. A method as defined in claim 1 in which said step of heat-diffusing the Mg is effected in the temperature range of 200° C. to 650° C.

4. A method as defined in claim 1 in which the base hydrogen storage alloy is selected from a group consisting of TiMn alloys, TiZrMnCrCu alloys and ZrFeCr alloys.

5. A method as defined in claim 1 in which the amount of Mg is in the range 2.5 to 10% by weight of the base hydrogen storage alloy.

* * * * *